United States Patent [19]

Donoghue

[11] Patent Number: 4,474,312

[45] Date of Patent: Oct. 2, 1984

[54] DISPENSING BOTTLE WITH METERED CHAMBER

[76] Inventor: Robert J. Donoghue, 4 Burnwood Dr., Bloomfield, Conn. 06002

[21] Appl. No.: 425,545

[22] Filed: Sep. 28, 1982

[51] Int. Cl.³ .............................................. B67D 5/06
[52] U.S. Cl. .................................... 222/205; 222/48; 222/207; 222/424; 222/438
[58] Field of Search .............. 222/205, 207, 211, 212, 222/215, 129, 44, 48, 47, 109, 437, 438, 457, 424, 424.5

[56] References Cited

U.S. PATENT DOCUMENTS

| | | | |
|---|---|---|---|
| 4,106,673 | 8/1978 | Donoghue | 222/215 X |
| 4,143,794 | 3/1979 | Stratford et al. | 222/42 |
| 4,243,157 | 1/1981 | Rettberg | 222/44 |
| 4,376,495 | 3/1983 | Spatz | 222/207 X |

*Primary Examiner*—Joseph J. Rolla
*Assistant Examiner*—George S. Pyryt
*Attorney, Agent, or Firm*—A. W. Breiner

[57] ABSTRACT

This invention relates to a dispensing unit for dispensing preselected quantities of liquid from a container, such as a squeeze bottle. The dispensing unit includes an outer cup member and an inner cup member, with the inner cup member having radial openings therethrough which are circumferentially spaced and at selected heights so as to determine the level of liquid within the inner cup member. The outer cup member is provided with an axial flow passage which may either be sealed by the inner cup member or which may have one of the openings in the inner cup member aligned therewith. The liquid dispensed into the inner cup member, if the inner cup member is accidentally overfilled, will seek the pre-set level so that the desired measured amount of the liquid which is to be dispensed will be retained within the inner cup member.

10 Claims, 15 Drawing Figures

U.S. Patent   Oct. 2, 1984   Sheet 1 of 4   4,474,312
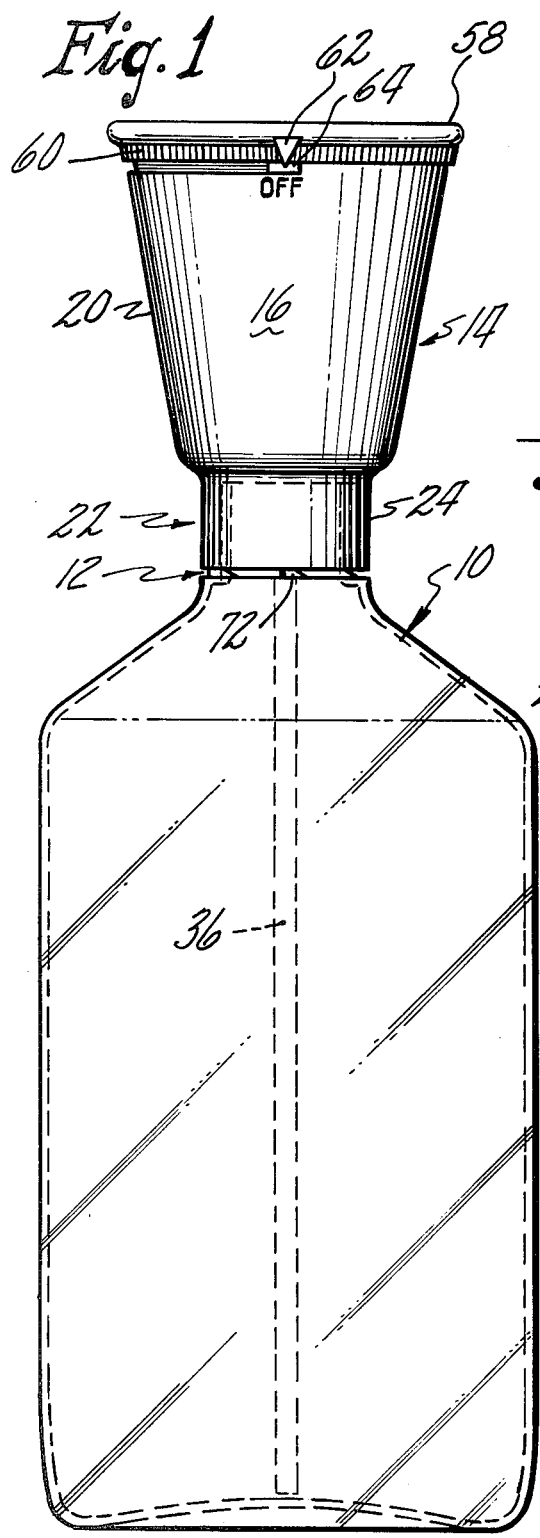
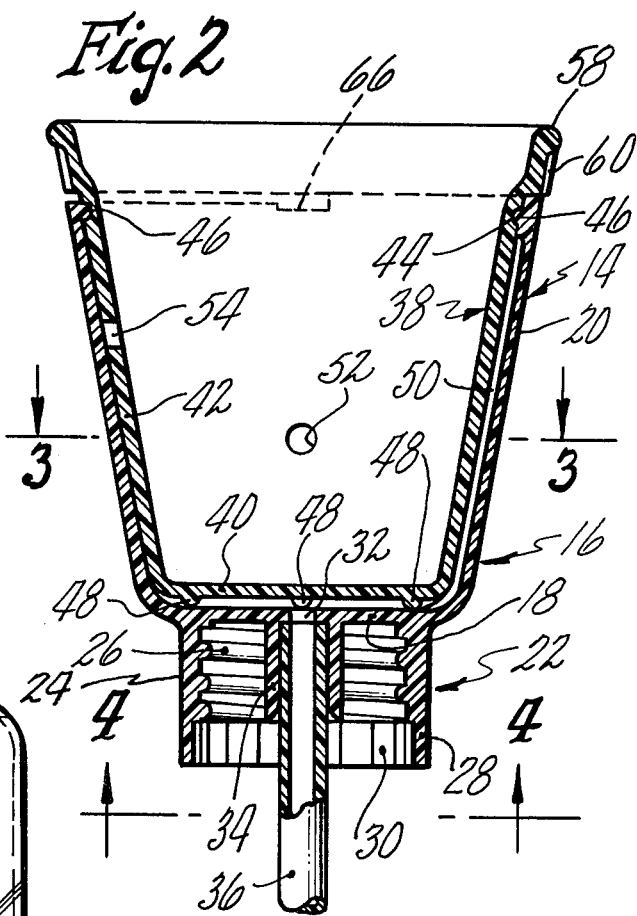
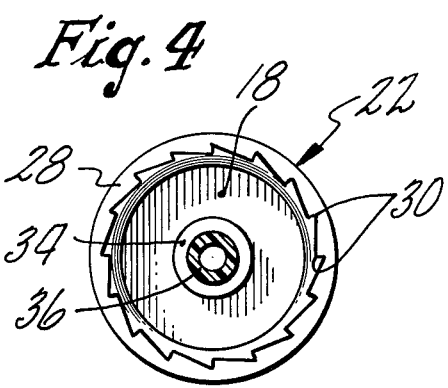
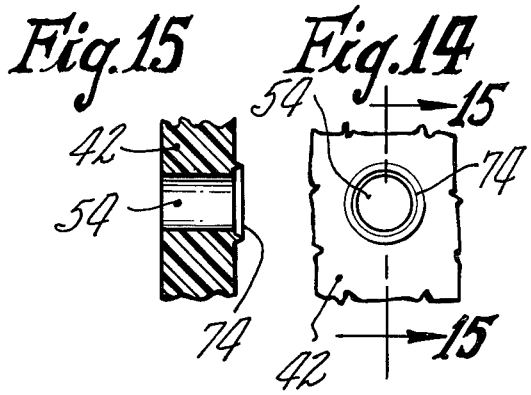

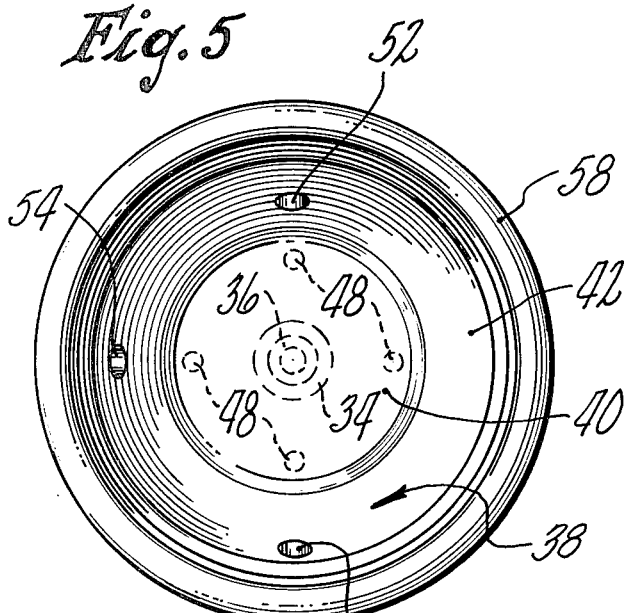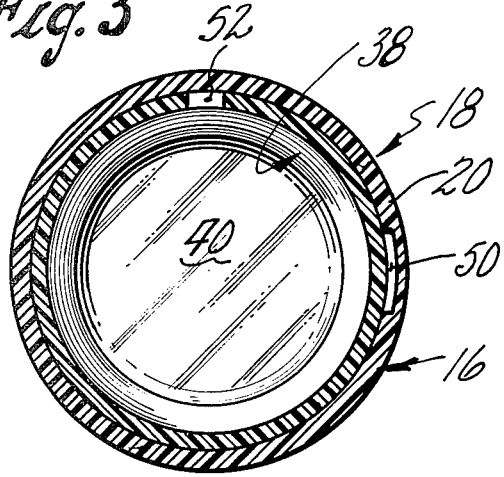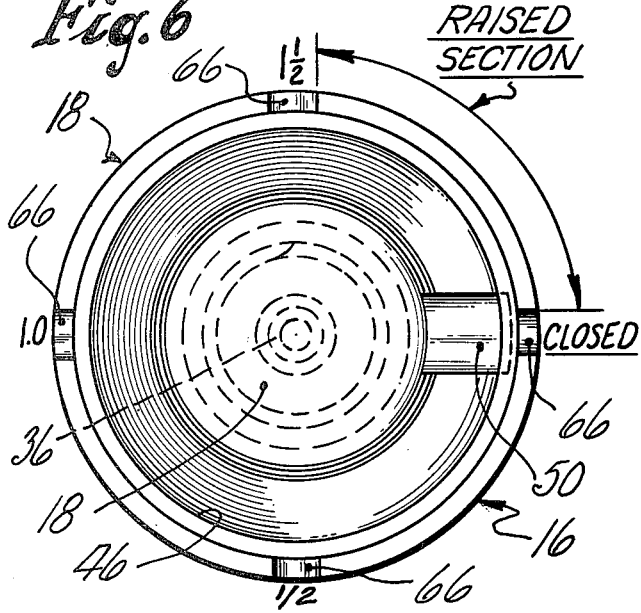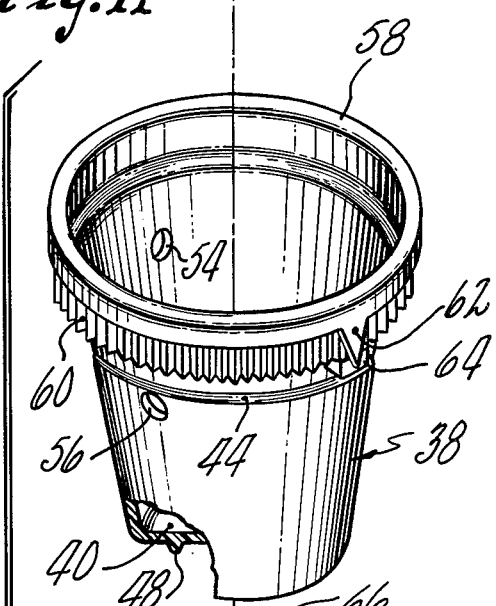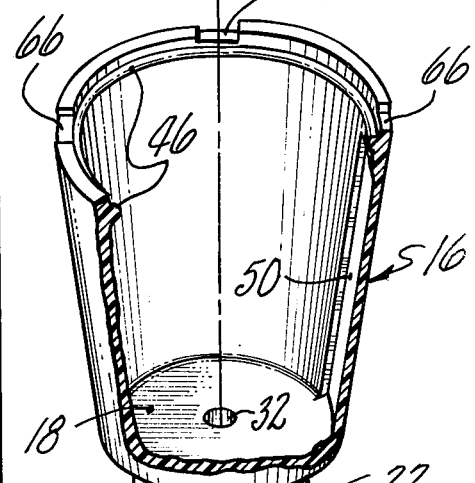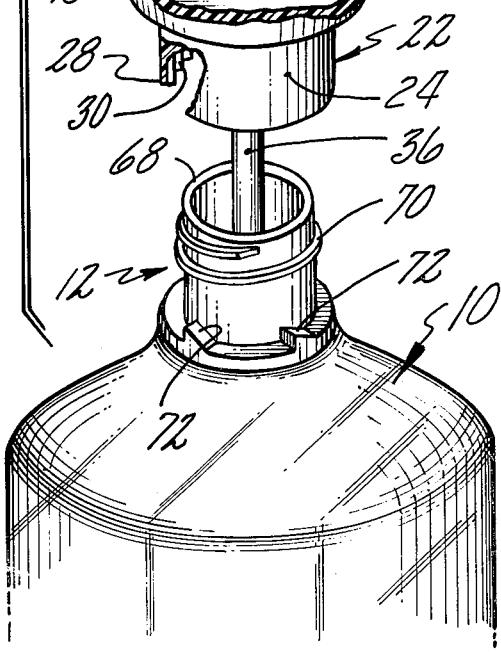

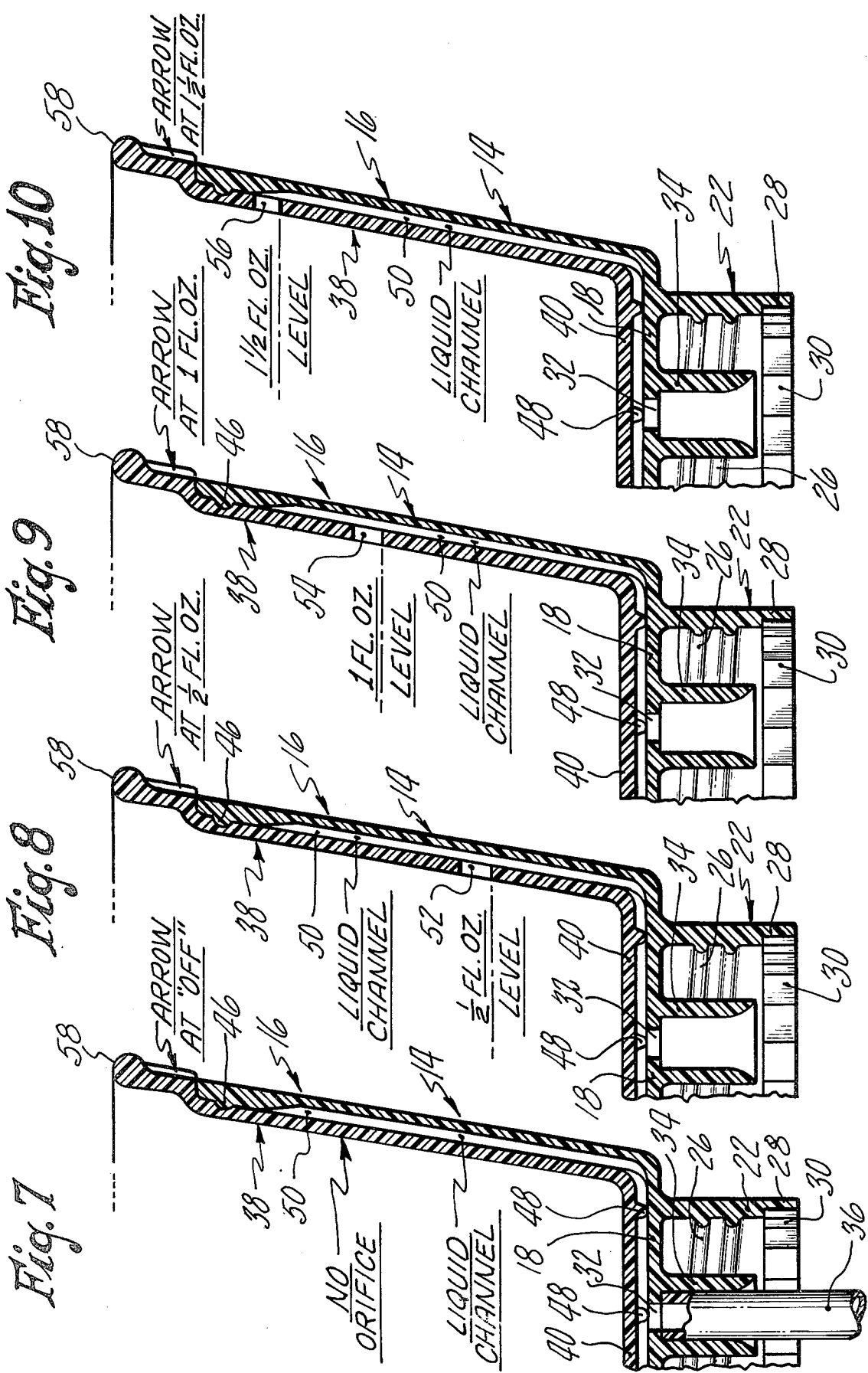

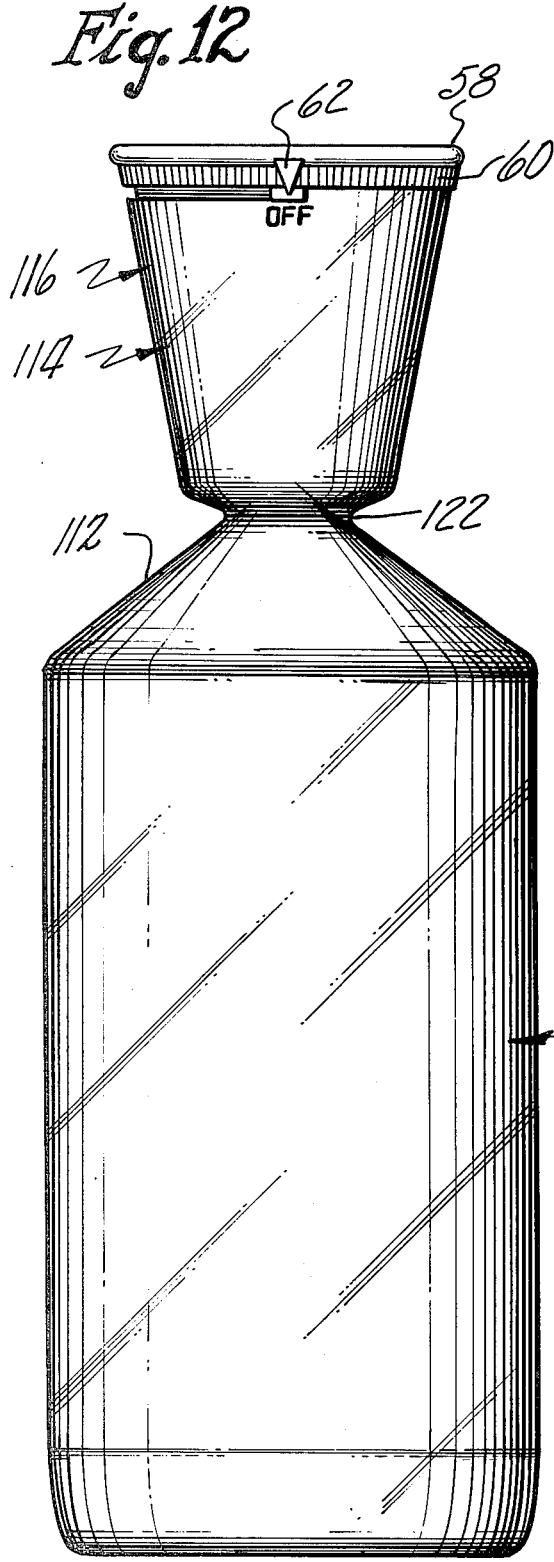
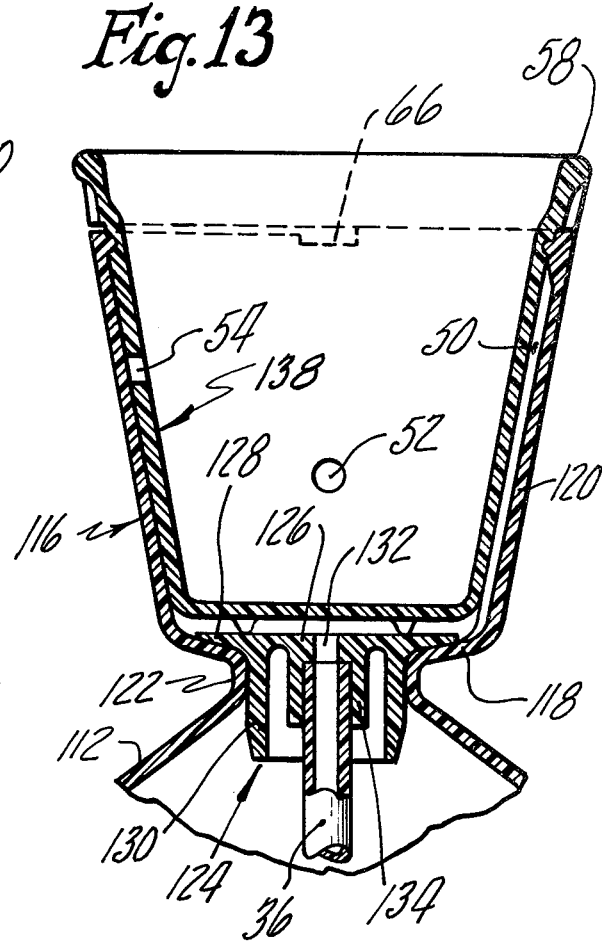

DISPENSING BOTTLE WITH METERED CHAMBER

This invention relates in general to new and useful improvements in dispensers, and more particularly to a dispenser which may be associated with a squeeze-type bottle or container, and wherein the dispenser may be pre-set to automatically dispense from the container into a cup a preselected quantity of the liquid.

Liquid dispensers for dispensing from a container, such as a squeeze bottle, into a measuring area selected quantities of liquid are well known. Among the prior art disclosures are my prior U.S. Pat. No. 3,141,574 granted July 21, 1964; U.S. Pat. No. 3,347,420 granted Oct. 17, 1967; U.S. Pat. No. 4,077,547 granted Mar. 7, 1978, and U.S. Pat. No. 4,106,673 granted Aug. 15, 1978. Of these patents, I believe that U.S. Pat. No. 4,106,673 is the most pertinent in that it does have to do with a dispenser of the general type to which this invention relates wherein there are telescoped cup members and wherein there is liquid flow between the telescoped cup members to fill and enter one of the cup members. This device, however, does not provide for the automatic dispensing of a preselected amount of the liquid.

There is also the patent to Stratford et al., U.S. Pat. No. 4,143,794 granted Mar. 13, 1979, which does permit dispensing into an annular cross-sectional container through a selected pair of openings whereby a preselected amount of liquid is placed within the container.

In accordance with the present invention, there is provided an automatic measuring dispensing unit wherein there is an outer cup member and an inner cup member, with the inner cup member having a bottom with a hole therein through which a liquid may be dispensed from an associated squeeze bottle. The other cup member is provided with a single channel extending up the interior thereof forming an axial flow passage for the liquid. The inner cup member is provided with a series of radial apertures therethrough which are circumferentially and axially spaced so that only one of the apertures at a time may be in communication with the axial flow passage and, depending upon the height of that opening, the amount of liquid dispensed into the inner cup member may be selected.

In accordance with this invention, the dispensing unit may be integrally formed with the container, or may be in the form of a closure which is threadedly engaged with the threaded neck of a conventional container or bottle.

A principal feature of the invention is that the liquid is dispensed into the inner cup member from which it may be readily poured or to which a further liquid may be readily added. The inner cup member thus may be utilized to readily dispense the product without any waste. Further, the relationship of the flow passages in the inner and outer cup members is such that the inner cup member cannot be filled on a permanent basis above the selected height, the excess liquid, if any will, automatically flow back into the container.

Another feature of the dispensing unit is that the radial flow passages in the inner cup member are positively sealed relative to the outer cup member except when the opening is aligned with the axial dispensing passage in the other cup member.

When the dispensing unit is in the form of a closure which is screw threaded onto a container neck, it is preferred that there be an interlocking engagement between the closure member and the container so that during the adjustment of the dispensing unit, the dispensing unit will not be accidentally loosened relative to the container.

Having described the invention in general terms, specific and presently preferred embodiments will be set forth in the context of the illustrative drawing.

FIG. 1 is an elevational view of one embodiment of my invention wherein the dispensing unit is attached to a stock squeeze bottle having a screw threaded neck.

FIG. 2 is an enlarged fragmentary vertical sectional view taken through the dispensing unit removed from the bottle.

FIG. 3 is an enlarged transverse sectional view taken on line 3—3 of FIG. 2 showing one of the passageways and the relationship of passages formed in the cup members.

FIG. 4 is a bottom view of the closure member taken generally along the line 4—4 of FIG. 2, and shows the interlocking feature on the skirt of the closure member for interlocking with the container neck finish.

FIG. 5 is an enlarged plan view of the dispensing unit.

FIG. 6 is an enlarged plan view of the dispensing unit with the inner cup member removed.

FIG. 7 is an enlarged fragmentary sectional view similar to FIG. 2 but through the axial dispensing passage with the dispensing unit in its closed position.

FIG. 8 is a fragmentary sectional view similar to FIG. 7 with the inner cup member rotated to a lower level liquid-receiving position.

FIG. 9 is a fragmentary sectional view similar to FIG. 8 with the inner cup member adjusted to an intermediate liquid-receiving level.

FIG. 10 is another view similar to FIG. 8 with the inner cup member rotated to the maximum liquid level receiving position.

FIG. 11 is an exploded perspective view with parts broken-away and shown in section of the components of the dispensing unit, and shows their relation to an upper portion of the squeeze bottle.

FIG. 12 is an elevational view of a modified form of the invention wherein the dispensing unit is an integral part of the container.

FIG. 13 is an enlarged fragmentary vertical sectional view taken through the dispensing unit and shows the specific construction thereof.

FIG.14 is an enlarged elevational view of the exterior of the inner cup member in the area of one of the radial openings therethrough.

FIG.15 is a fragmentary vertical sectional view taken generally along the line 15—15 of FIG. 14, and shows the seal construction for sealing the inner cup member to the outer cup member surrounding the radial opening through the inner cup member.

Referring now to the drawing in detail, it will be seen that there is illustrated in FIG. 1 a conventional type of squeeze bottle 10 having a neck finish 12 to which there is released and secured a dispensing unit in accordance with this invention, the dispensing unit being generally identified by the numeral 14.

The dispensing unit 14 includes an outer cup member 16 which has a bottom wall 18 and a generally tapered body 20. The bottom wall 18 forms the top wall of a closure member 22 which further includes a skirt 24 which is provided with internal threads 26. The skirt 24 has an extension 28 which is provided on the inner surface thereof with a plurality of ratchet teeth 30.

The top wall 18 of the closure 22, which is the bottom wall of the outer cup member 16, has an essential dispensing opening 32 therethrough. Surrounding the dispensing opening 32 and depending from the wall 18 is a sleeve 34 in which the upper end of a tube 36 is secured.

The dispensing unit 14 also includes an inner cup member 38 which has a bottom wall 40 and a generally tapered body 42, the taper which corresponds to the taper of the body 20 of the outer cup member 16.

The inner cup member body 42 extends axially upwardly beyond the body 20, and is provided in spaced relation to its upper edge with a circumferential groove 44 in its outer surface, the groove 44 receiving a radially inwardly and directed bead 46 carried by the upper inner surface of the body 20. In this manner there is a snap interlock between the cup members 16 and 38 which prevents the separation thereof and also provides a sealing engagement therewith while still allowing for rotation between the two members 16 and 38.

The bottom wall 40 is spaced above the bottom wall 18 by a plurality of circumferentially spaced dimples 48. Thus, there is a flow passage between the bottom walls 18 and 40 in communication with the dispensing opening 32. As is best shown in FIGS. 3 and 6, the outer cup member 16 is provided with an axial flow passage 50 which is generally rectangular in cross-section and extends from the bottom wall 18 to a point below the bead 46 where it is closed.

In order to assure filling of the inner cup member 38 to different levels, the inner cup member 38 has formed in the body 42 thereof a plurality of radially extending openings or passages. These passages, as is best shown in FIG. 5, includes a lower passage 52, an intermediate passage 54, and a higher passage 56. It thus will be seen that the passages 52, 54, 56 are circumferentially spaced and at different axial heights.

The inner cup member 38 extends above the outer cup member 16 and terminates in a rounded pour lip 58. It will be seen that the upper portion of the inner cup body 42 is radially outwardly offset so as to overlie the upper end of the body 20. Below the pour lip 58 the offset portion of the body 42 is provided with vertical knurling 60 to facilitate gripping of the inner cup member 38 to effect rotation thereof.

Referring now to FIG. 11, it will be seen that associated with the knurling 60 and generally depending from the lip 58 is a downwardly directed arrow 62. Immediately below the knurling 60 and in alignment with the arrow 62 is a locking lug 64. The locking lug 64 engages a select one of a plurality of notches 66 formed in the upper edge of the body 20, as is also best shown in FIG. 11. This type of a detent is illustrative of one of many well-known types of detent available to prevent accidental rotation or movement.

It is to be understood that the upper portion of the body 20 will be provided with suitable indicia underlying each of the notches. This indicia will include statements such as OFF, $\frac{1}{2}$, 1.0, and 1$\frac{1}{2}$, thus identifying the relative rotational position of the inner cup member 38 with respect to the outer cup 16.

In use, the dispensing unit 14 will be secured to the bottle neck finish 12 by way of the threads 26 of the closure member 22. As is shown in FIG. 11, the bottle neck finish 12 includes a neck portion 68 which is provided with external threads 70. At the base of the neck portion 68 there is a series of upstanding teeth or lugs 72 which interlock with the ratchet teeth 30 when the closure member 22 is secured to the position where the wall 18 is sealed with the end of the neck portion 68.

When it is desired to dispense a preselected amount of liquid from the bottle 10, the inner cup member 38 is rotated to the desired selected position, i.e., $\frac{1}{2}$, 1.0, or 1$\frac{1}{2}$ fluid ounce. Then the bottle 10 is squeezed so as to reduce the volume thereof, forcing liquid up through tube 36, opening 32, and into the axial flow passage 50 from which it is free to flow into the interior of the inner cup member 38 through one of the openings 52, 54, and 56 aligned with passage 50. While it may be possible to fill the inner cup member 38 to a height above the selected height, as soon as the bottle 10 is released, the excess liquid will flow back out through the opening aligned with the flow passage 50, back down through the tube 36 into the bottle; after which the selected metered amount may be readily poured from the cup member 38.

At this time it is pointed out that with the construction illustrated in FIG. 2, the bodies 20 and 42 of the cup members will have a sufficiently close fit so as to prevent leakage out of the flow passage 50. On the other hand, in some cases it may be necessary or desirable to provide a seal to the exterior surface of the body 42 surrounding each of the several openings, for example the opening 54 is provided with an integral sealing ring 74 as shown in FIGS. 14 and 15. Each sealing ring 74 will engage the internal surface of the body 20 and seal against fluid flow into or out of the inner cup member 38 through any of the openings thereof.

Merely for the purpose of describing the operation of the dispensing unit, reference is made to FIGS. 7-10 wherein there is illustrated different rotational positions of the inner cup member 38 relative to the outer cup member 16. It will be seen that by rotating the inner cup member from its OFF position to selectively align any one of the openings 52, 54, and 56 with the axial flow passage 50, the inner cup member 38 may be filled with liquid to that preselected level and then the measured amount can be dispensed.

Reference is now made to FIGS. 12 and 13 wherein there is illustrated a slightly modified form of dispensing unit generally identified by the numberal 114. The dispensing unit 114 includes an outer cup member 116 and an inner cup member 138. The inner cup member 138 will be identical with the inner cup member 38 previously described, and no further description thereof will be necessary. Further, the body 120 of the outer cup member 116 will be of an identical construction with that of the body 20, and no further description is required.

The difference is that the other cup member 116 is integrally formed with a container 110. The container 110 is provided with a tapered shoulder portion 112 which, in turn, converges to a ring portion 122. A partial bottom 118 of the outer cup member 116 is integrally connected to the ring portion 122.

The bottom of the outer cup member 116 is completed by way of a plug generally identified by the numeral 124 and seated in sealing engagement with the ring portion 122, as is clearly shown in FIG. 13. The plug 124 includes a transverse wall 126 having radially outer portions 128 overlying the partial wall 118 and primarily forming the bottom of the outer cup member 116.

The plug 124 also includes an outer plug portion 130 which is snugly received in the ring portion 122. The wall 126 is provided with essential dispensing opening 132 which opens into the space between the cup members 116 and 138, and which is surrounded on the underside of the wall 126 by a sleeve 134 into which the upper end of the tube 36 is telescoped.

The dispensing unit 114 functions in the same manner as the dispensing unit 14 and no further description is necessary.

Although only two preferred embodiments of the invention have been specifically illustrated and described herein, it is to be understood that minor variations may be made in the dispensing unit without departing from the spirit or scope of the invention as defined by the appended claims.

It is claimed:

1. An automatic measuring dispensing unit for a squeeze-type container, said unit comprising an outer cup member having a body and a bottom wall with a dispensing opening through said bottom wall, an axial flow passage on an interior surface of said body and extending to said bottom wall, said axial flow passage having a closed upper end, an inner cup member seated in said outer cup member and having a bottom wall spaced above said outer cup member bottom wall for constantly placing said axial flow passage in communication with said dispensing opening, said inner cup member having a body nested in said outer cup member body with said inner cup member being rotatable about said outer cup member, said inner cup member body having therethrough a series of radial openings therethrough arranged in circumferentially and axially spaced relation for selective alignment with said axial flow passage to supply a liquid to said inner cup at selected levels, said inner cup being sealed to said outer cup around each radial opening except when that radial opening is aligned with said axial flow passage.

2. A dispensing unit according to claim 1 wherein there is an interlock between said cup members for preventing relative axial movement of said cup members.

3. A dispensing unit according to claim 1 wherein said inner cup member extends axially above said outer cup member to facilitate dispensing of a liquid from said inner cup member and rotation of said inner cup member.

4. A dispensing unit according to claim 1 wherein said inner cup member extends axially above said outer cup member to facilitate dispensing of a liquid from said inner cup member and rotation of said inner cup member, and said inner cup member having an external surface above said outer cup member roughened to facilitate gripping.

5. A dispensing unit according to claim 1 wherein there are interlock means between said cup members for fixedly locking said inner cup member in a selected rotated position.

6. A dispensing unit according to claim 1 wherein said inner cup has a projecting sealing surface on the exterior thereof surrounding each radially spaced opening for forming said sealing between said cup member bodies.

7. A dispensing unit according to claim 1 wherein said outer cup member body is an integral extension of the container and said outer cup member bottom is defined by a plug seated in a reduced diameter neck portion of said container.

8. A dispensing unit according to claim 1 wherein said outer cup member bottom is a top portion of a closure member.

9. A dispensing unit according to claim 1 wherein said outer cup member bottom is a top portion of a screw threaded closure member.

10. A dispensing unit according to claim 9 wherein there is a rotational interlock between said closure member and the container for preventing loosening of said closure member when adjustably rotating said inner cap member.

* * * * *